(No Model.)
A. W. SNYDER.
CUT FLOWER SUPPORT.
No. 248,519. Patented Oct. 18, 1881.
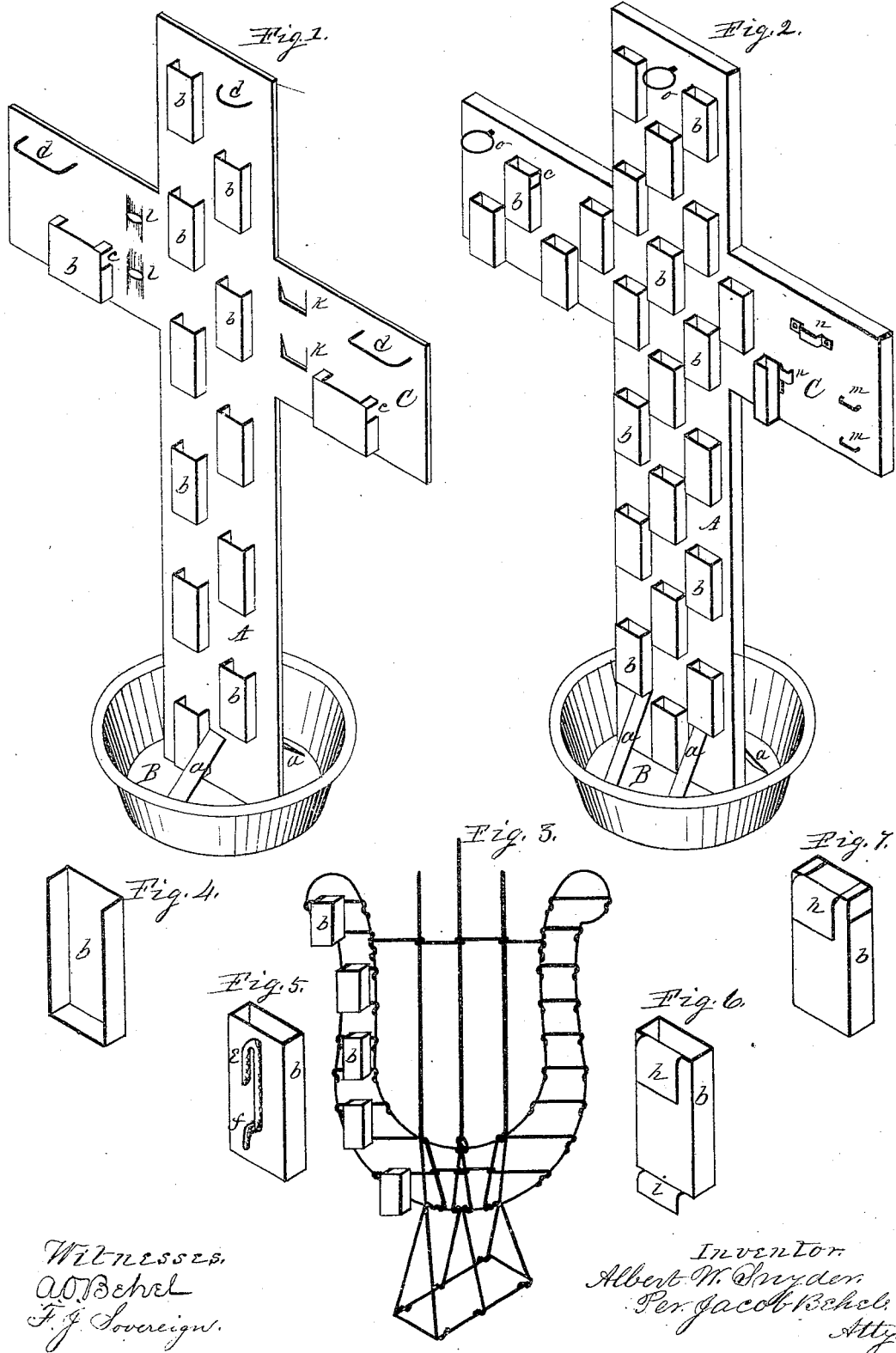
Witnesses
A. O. Behel
F. J. Sovereign
Inventor
Albert W. Snyder
Per Jacob Behel
Atty.

UNITED STATES PATENT OFFICE.

ALBERT W. SNYDER, OF ROCKFORD, ILLINOIS.

CUT-FLOWER SUPPORT.

SPECIFICATION forming part of Letters Patent No. 248,519, dated October 18, 1881.

Application filed August 6, 1851. (No model.)

*To all whom it may concern:*

Be it known that I, ALBERT W. SNYDER, a citizen of the United States, residing in the city of Rockford, in the county of Winnebago and State of Illinois, have invented a new and useful Improvement in Cut-Flower Supports, of which the following is a specification.

My invention relates to foundation-supports for cut-flower designs. Its object is to produce foundation-supports of various designs to receive and support cut flowers in design in water for the better preservation thereof; and it consists in providing foundation-design supports with loops in connection with cups or receptacles in which to support cut flowers, and adapted to contain water in contact with the flower-stems for their better preservation.

To this end I have designed and constructed the improvements represented in the accompanying drawings, in which—

Figure 1 is an isometrical representation of a cross made from plate material embodying my invention. Fig. 2 is also an isometrical representation of a cross representing a modification of the application of my improvement. Fig. 3 is a representation of a lyre in wire-work with my improvement placed thereon. Figs. from 4 to 7, inclusive, represent cups detached, showing forms of attachments.

In the figures, A represents the vertical portion or shaft of the cross, having its foot portion fixed in a basin, B, and suitably supported therein by means of braces $a$, connecting it with the vessel.

At C is represented the transverse bar, fixed at right angles to the shaft. These parts may be made from any suitable material. The cross represented at Fig. 1 is made from plate material, and in which $b$ represents cups of box form, made from plate material, having their edge portions soldered to the bars of the cross. These cups are of suitable form to receive the end portion of the stems of the cut flowers and to contain water in contact with the stems for the purpose of preserving the flowers, and are distributed on the several portions of the cross in position best adapted to the floral design intended. Some of these cups, or as many of them as may be found necessary to facilitate the production of the floral design, are provided with side openings (represented at $c$) to receive the stems of the flowers.

At $d$ are represented loops of staple, ring, or other convenient form, to receive the stems of the cut flowers, and are fixed to the cross in position to best distribute the flowers to produce the design intended, and relatively with the cups, to permit the end portion of the flower-stems to be placed in the cups.

In the use of my improved support the cut flowers are suitably placed in position thereon to produce the required design, having their stem portions properly placed in the cups, and when required to support the flower or flowers in the desired position their stems are first passed through one or more of the loops and then into the cup. These cups, and also the basin containing the stems of the flowers, are supplied with water in contact with the stems of the flowers for the purpose of preserving them.

Instead of the cups being soldered to the plate-support, as in Fig. 1, they may be made independent, as represented in the several figures from 5 to 7, inclusive, and provided with a wire hook, as at $e$, or hooks, as at $e$ and $f$, or a plate-hook, $h$, or hooks $h$ and $i$, adapted to engage slots $k$ or eyes $l$, formed in the plate-support.

When the supports are made from wood of some thickness, as the cross represented at Fig. 2, staples, as at $m$, may be driven into the frame, or loops, as at $n$, fixed to the frame, may be employed, and instead of the loops $d$, provided to receive the stems of the flows, screw-eyes, as represented at $o$, of any suitable conformation, may be employed, and by means of their screw-shank may be readily changed to any position on the support.

Suitable supports on which to place the cups are readily formed in wire-work, a sample of which is represented at Fig. 3, in which suitable loops to receive the hooks of the cups, and through which to pass the stems of the flower, are readily formed of the cross-bars of the frame.

In the foregoing I have represented my improvement in connection with frame-supports constructed of plate material, wood, and wire; but other material capable of use for the purpose may be employed, and, instead of the plate form, frame designs may be produced, and designs of any of the known forms suitable for floral designs may be employed as supports for the cups and loops, as hereinbefore described, on which to arrange cut flowers.

I claim as my invention—

1. The combination, with the frame or support of a floral design, of small cups constructed to contain water and receive the stems of the flowers, the cups being suitably distributed on the frame to constitute the design, substantially as set forth.

2. The combination, with the frame or support of a floral design, of small cups constructed to contain water and receive the stems of the flowers, and loops located above any or all of said cups to support the flowers, the cups being suitably distributed on the frame to constitute the design, substantially as set forth.

3. In a floral design, the combination, substantially as herein described, of a foot-basin, a frame-formed support, water-cups, and stem-receiving loops, these several parts constructed and arranged substantially as and for the purpose hereinbefore set forth.

ALBERT W. SNYDER.

Witnesses:
JACOB BEHEL,
A. O. BEHEL.